United States Patent

[11] 3,631,606

[72] Inventor Allan C. Thorpe
 Raleigh, N.C.
[21] Appl. No. 42,183
[22] Filed June 1, 1970
[45] Patented Jan. 4, 1972
[73] Assignee International Business Machines Corporation
 Armonk, N.Y.

[54] OPERATOR GUIDANCE SYSTEM
 5 Claims, 5 Drawing Figs.
[52] U.S. Cl. ........................................ 35/8 R
[51] Int. Cl. ....................................... G09b 5/02
[50] Field of Search ........................... 35/8 R, 9 R, 48 R

[56] References Cited
 UNITED STATES PATENTS
 3,355,819 12/1967 Hannah ........................ 35/9 R
 3,332,157 7/1967 Kirkconnell et al. ......... 35/48 R
 3,482,329 12/1969 Le Marr ....................... 35/9 R
 3,355,818 12/1967 Whitehorn ................... 35/9 R Primary Examiner—Wm. H. Grieb
Attorneys—Hanifin and Jancin and John B. Frisone

ABSTRACT: A plurality of serially arranged images each containing coded control data and associated instructional data are serially scanned by a selective decoding device which causes a display of associated instructional data when predetermined coded data is detected. The displayed instructional data is utilized for guiding a human operator in the performance of one or more functions. When the required function or functions have been completed, scanning is resumed until a next predetermined coded data is detected, at which time the above process is repeated. The scanning process continues until the last image in the serial string has been scanned at which time the selective decoding device may be changed to provide a different cycle or the same cycle may be repeated.

PATENTED JAN 4 1972

OPERATOR GUIDANCE SYSTEM

BACKGROUND OF THE INVENTION

1. Field of the Invention

This invention relates to operator guidance systems in general and more particularly to guidance systems suitable for use with a variety of input/output devices designed for use with a digital computer in a wide variety of interactive or data collection environments.

2. Description of the Prior Art

Computers are being used more and more in both interactive and data collection systems operating in real time. These systems utilize a wide variety of input/output devices for enabling automatic devices and human operators to provide the necessary data to the system via the input devices.

When automatic reporting devices are used, system difficulties are held to a minimum and minor equipment modifications result in the solution of the few remaining difficulties. However, in the case of human operators, difficulties may arise at any time and the solution in most instances requires extensive operator training and the selection of highly skilled machine operators for inputing data to the system.

The shortage of skilled operators and the difficulty and expense of training operators has limited the application of real time interactive and data collection systems. In many instances, the use of skilled machine operators is unsatisfactory since they are ordinarily unaware of specific information and knowledge necessary to interact with the system.

To a certain extent, the problems encountered in the training of human operators have been overcome by providing operator guidance in proximity to the input terminal. The guidance devices have to a very large degree proven successful in reducing the operator skill level required and in many instances reduced the skill level sufficiently to permit relatively untrained operators skilled in the field of application to operate with both interactive and data collection systems using digital computers.

Operator guidance systems fall into two broad categories. The first category includes those guidance systems in which the operator signals the computer and identifies the function to wishes to perform and the computer supplies guidance instructions appropriate to the function. The second category includes those guidance systems in which the operator identifies the function and the necessary instructions are locally generate at the input device.

Operator guidance systems falling in the first category are without doubt the most versatile since the instruction set can be easily changed by simply reprogramming the control computer. However, they have not found widespread usage since they require extensive communications capacity to accommodate the increased data traffic between the input devices and the control or central computer for requesting and supplying the instructional data. Guidance systems of this type have been limited in application to those instances where distances between the input device and the computer were short or a wide band communications link at a reasonable cost was available for linking the input device and the computer.

Operator guidance systems falling in the second category have found the most extensive use since they do not consume any of the available transmission medium capacity and they are particularly suitable for use in buffered terminal systems where entire messages are buffered before transmission. They are, however, less versatile and are generally implemented in hard wired components. Because of their implementation, they are difficult to alter and limited in the total number of instructions they can accommodate.

Systems of both types invariably utilize illuminated labels as the means for conveying the required instructions to the operator. This display technique is expensive to implement and maintain since it requires a large number of lamps and the necessary control and current-switching equipment.

SUMMARY OF THE INVENTION

The invention contemplates an operator guidance instruction display system comprising a plurality of serially arranged images each containing instructional and coded control data in discrete predetermined locations, selective decoding means arranged for scanning said images, means for causing relative movement between said selective decoding means and said images, means responsive to said selective decoding means for terminating relative movement between the said selective decoding means and said images when said selective decoding means detects predetermined coded control data, means for displaying the instructional data associated with the said detected predetermined coded control data whereby a human operator may perform functions specified by the instructional data, and means for resuming relative movement between the selective decoding means and the images operable at the termination of the instructed functions.

DESCRIPTION OF THE PREFERRED EMBODIMENTS

Figure 1:
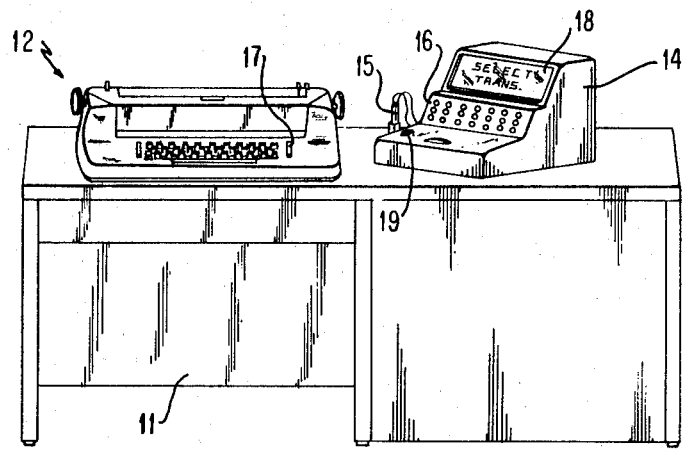
FIG. 1 is a perspective view of a data entry device provided with a novel operator guidance system constructed in accordance with the invention.

In FIG. 1, a combination cabinet and desk 11 supports an input/output terminal 12 and an operator guidance system 14 according to the invention and which will be described in greater detail later in connection with the detailed description of the following figures of the drawings.

When an operator wishes to enter into an interactive or data collection transaction, he must remove the selective detector 15 from its storage well and insert it in the appropriate opening in a program plug panel 16 as well as turn on power if the terminal is shut down. The program plug panel 16 bears printed indicia adjacent each of the openings indicating which transaction is selected by inserting selective detector 15 in the associated opening. When the selective detector 15 is properly positioned, the operator activates the display system by depressing a program advance key 17 mounted on the keyboard of the terminal 12. This activates the display and the first instruction of the selected transaction is displayed on a screen 18. After the operator satisfies the instruction, he must depress the program advance key 17 whereupon a next subsequent instruction is displayed on screen 18. After the last instruction is displayed and program advance key 17 is depressed, the display device advances to a reset (transaction select) condition. In this condition, the selective detector may be repositioned to enable a different transaction or the same transaction may be repeated by actuating the program advance key 17. A step key 19 is provided on the guidance system 14 for causing instruction advance uncontrolled by the selective decoder 15 to thus permit an operator to skip instruction steps, repeat instruction steps or abort a transaction by stepping to the previously described reset or "select transaction" state.

Figure 2:
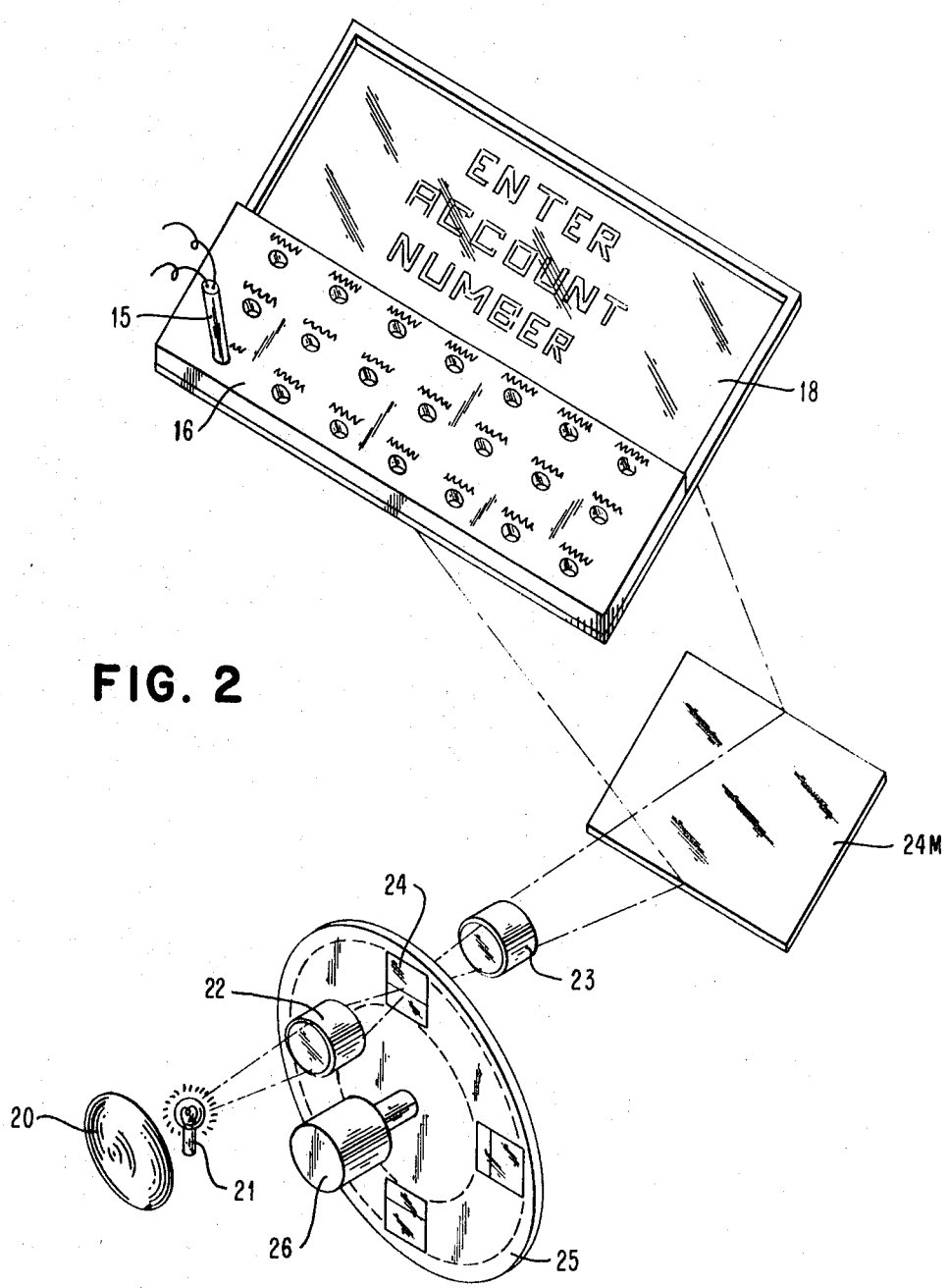
FIG. 2 is a perspective view of the mechanical elements of the novel operator guidance system illustrated in FIG. 1 with the covers and supporting structure removed to enhance understanding of its operation.

The mechanical details of the system 14 illustrated in FIG. 2 and those elements previously described in connection with the description of FIG. 1 bear the same reference numerals. A projection subsystem including a spherical mirror 20, a lamp 21, a condensing lens 22, a magnifying lens 23 and a mirror 24M projects an image contained on a film frame 24 onto the screen 18. Plug panel 16 overlies a portion of screen 18 and contains 21 discrete areas which may be selectively illuminated under control of a coded portion of the film 24. The selective detector 15 is inserted in the appropriate opening in plug panel 16 and is activated any time that the screen in registration with the opening within which it resides is illuminated under control of the coded portion of the film 24.

Figure 3:
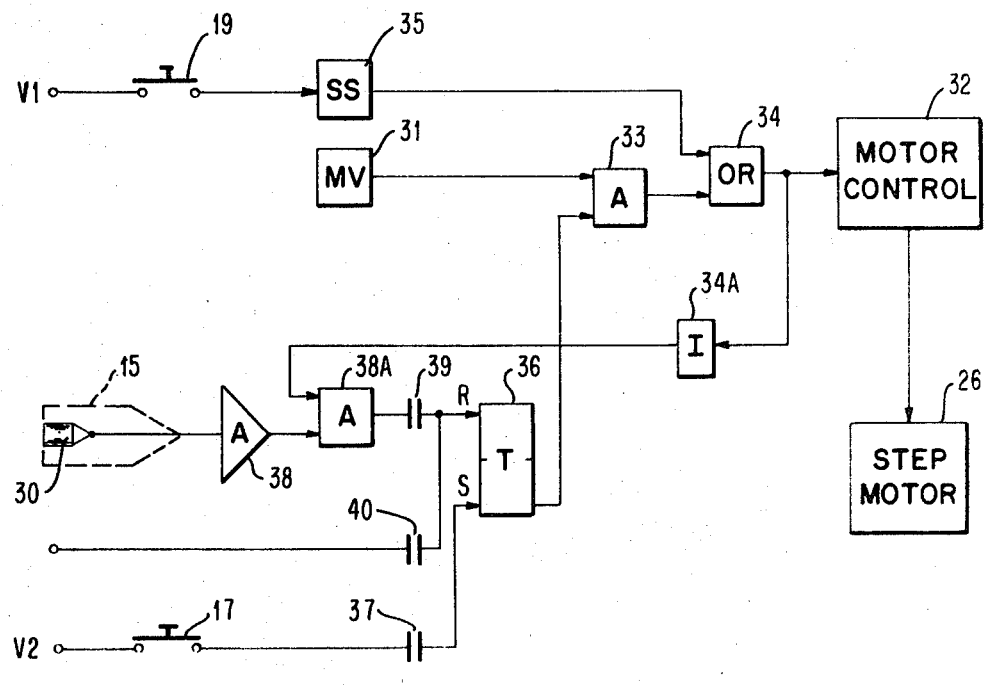
FIG. 3 is a schematic diagram illustrating the operation of the novel operator guidance system illustrated in FIGS. 1 and 2.

Film 24 is supported on a circular carrier 25 which is mounted for rotation on a rotary stepper motor 26. Motor 26 is positioned to place the film carrier 25 between the condensing lens 22 and the magnifying lens 23. The lenses and the motor are provided with appropriate adjustments so that a sharp, clear image will be formed on the screen 18. The details of the necessary support structure for the elements have been eliminated to simplify the drawing. They are, however, conventional in all respects. In addition, a conventional shutter mechanism may be provided to remove light from the screen 18 while the stepper motor 26 moves the film carrier 25 to prevent unintentional activation of the selective detector 15. A shutter mechanism is not essential to operation since the detector 15, which includes a conventional light-detecting cell 30, FIG. 3, is automatically inhibited during film transport. Thus, accidental illumination of the light detector 30 has not effect during periods of image change.

Figure 2A:
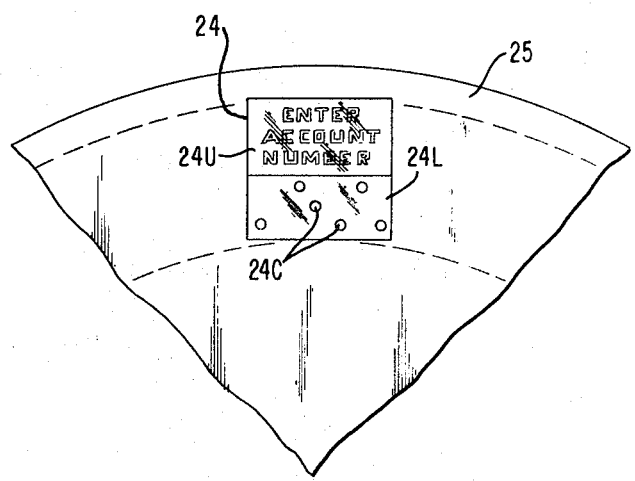
FIG. 2a is an enlarged plan view of an image element illustrated in FIG. 2.

The film 24, FIG. 2a, is divided into two sections. The upper section 24U contains the instructional data displayed on the visible portion of screen 18. The lower section 24L of film 24 contains coded data in the form of up to 21 transparent areas, several of which are illustrated by the small circles 24C. Each film frame will include one or more transparent areas. If an instruction is applicable to one or more transactions, it will contain a transparent area which when projected, will be in registration with the opening associated with that transaction identified on plug panel 16. It may be necessary to duplicate instruction in some instances. This will happen if two different transactions require the same instruction but in a different sequence. The solution is to duplicate the instruction frame and code each film frame for the appropriate transaction. Then place the coded film frames in the correct sequence for its transaction. Many instructions will be utilized in several transactions and in substantially the same order; thus, the above technique will find limited use. The film frames 24 are arranged around the periphery of circular film carrier 25 and are displayed sequentially and serially as motor 26 steps. Other serial film arrangements such as strip films will be equally effective, however, the illustrated arrangement was chosen since it provided the lowest cost and most reliable film transport mechanism suitable for this application.

In FIG. 3, a free-running multivibrator 31 is connected to a motor control circuit 32 via an AND-circuit 33 and an OR-circuit 34. If AND-circuit 33 is enabled, each pulse from multivibrator 31 causes motor 26 to increment or step one position. Motor control circuit 32 is conventional and provides the necessary power to operate motor 26 in response to the logic control signals received via the path described above.

The step key 19 connects a power supply $V_1$ to a single-shot circuit 35 which provides a pulse to motor control circuit 31 via OR-circuit 34 each time step key 19 is depressed. These pulses cause motor 26 to increment or step as described above. Thus, the operator may manually advance the instruction format one film frame at a time by successively depressing step key 19.

The program advance key 17 when depressed connects a voltage source $V_2$ to the "set" input of a trigger circuit 36 via a capacitor 37. Thus, each time the program advance key 17 is depressed, trigger 36 is set and the AND-circuit 33 is enabled. As soon as AND-circuit 33 becomes enabled, pulses from multivibrator 31 are applied via OR-circuit 34 and motor control circuit 32 to step motor 26.

When trigger 36 is reset, pulses from multivibrator 31 are no longer supplied to motor control 32 and the stepping of motor 26 stops. The output from photocell 30 in selective detector 15 is applied via an amplifier 38, an AND-gate 38A and a capacitor 39 to the reset input of trigger 36.

The output of photocell 30 which occurs when the photocell detects light causes motor stepping to stop. With this arrangement, detection of light in registration with an opening in plug panel 16 within which the detector resides will cause stepping motor 26 to stop, thus displaying on screen 18 the instructional data contained on the film frame containing the coded data which stopped motor stepping. The output of OR-circuit 34 is inverted in an inverter 34A and then applied to the other input of AND-circuit 38A to inhibit the output of light-detecting cell 30 during periods of step motor movement. Thus, accidental illumination of cell 30 during film transport will not reset trigger 36. Trigger 36 will also be reset any time power is turned "on" from the previously "off" condition. This is accomplished by connecting the reset input of trigger 36 to one of the power supplies via a capacitor 40.

The embodiment described above requires operator intervention to step the instruction program from one step to the next. In many applications, this is desirable. For example, if the data being supplied by the operator is mostly of variable length, the manual step device described is desirable. However, if the nature of the application requires large quantities of fixed length data fields, automatic stepping is desirable. Such an automatic system is illustrated in FIG. 4.

Figure 4:
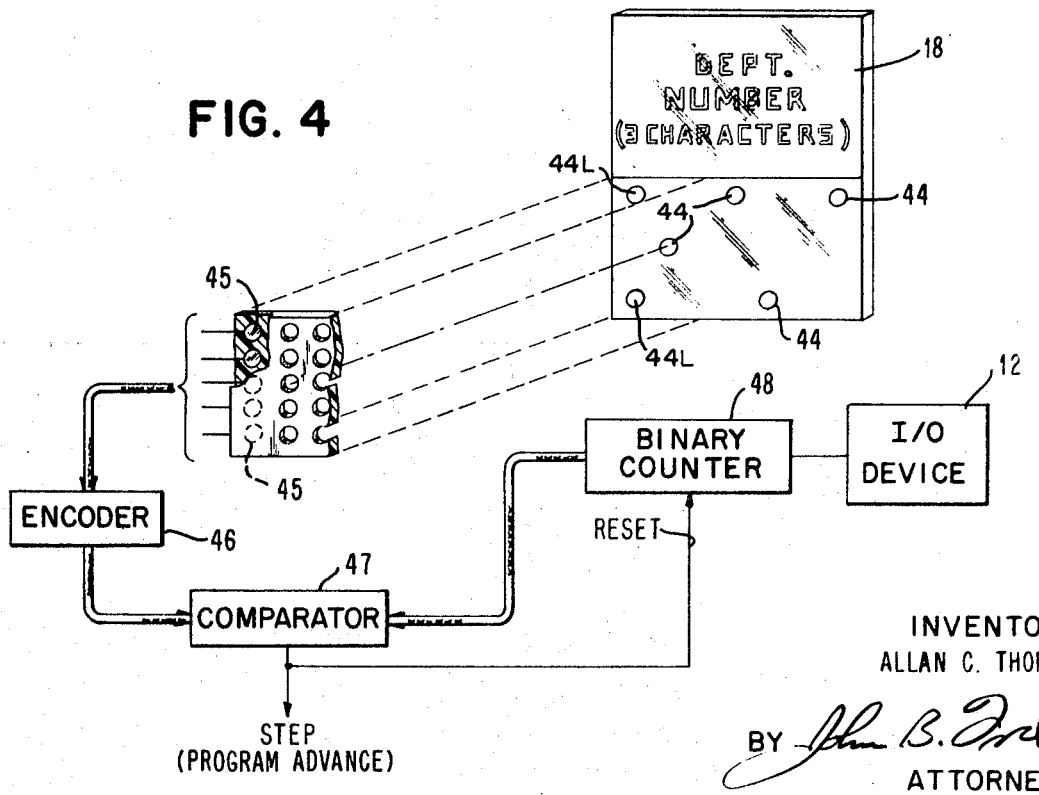
FIG. 4 is a schematic diagram of another embodiment of the invention illustrated in FIG. 1.

According to FIG. 4, the coded portion of the film frame includes a length code which is illustrated on the lower left side of screen 18 at 44L. This coded area cooperates with a number of fixed photocells 45 mounted within the plug panel 16 to provide an output indicative of the length of the character field required to satisfy the instruction. The program or instruction code previously described illuminates the areas 44 on the right side of the screen 18. An encoder 46 accepts the outputs of photocells 45 and provides a signal to a comparator circuit 47 indicative of the binary count equal to the field length. Each time the operator enters a character in the input/output terminal 12, a pulse is generated. These pulses are applied to a binary counter 48 which has its output connected to comparator circuit 47. When the outputs of encoder 46 and counter 48 are equal, comparator circuit 47 provides a pulse which is applied to the set input of trigger 36 thus achieving automatic program advance without operator intervention. The output of comparator 47 is also fed back to the reset input of counter 48 to make it ready for the next data entry which will be in conformity with the next displayed instruction.

Variable fields may be interspersed with fixed fields by appropriate coding of the field length so that counter 48 will never achieve the value supplied by encoder 46 and including in the displayed material an instruction requesting the operator to utilize manual program advance as previously described. In addition, the manual advance signal must be applied to the reset input of counter 48 to prepare it for the next data entry which may be either of variable or fixed length.

The system described above is quite suitable for use an an operator guidance system. It is not only inexpensive to manufacture, but is very easily adapted to change. Changing or expanding use of the system requires no rewiring or other hardware changes. The operator needs only to substitute a new carrier bearing several new programs and the operation of the machine is adapted to the new and expanded use. In fact, each machine may be provided with several carriers each containing many programs and all the operator needs to do is select the appropriate carrier bearing the program he wishes to utilize. Once the selection is made, the carrier is inserted and the operation can begin.

While the invention has been particularly shown and described with reference to preferred embodiments thereof, it will be understood by those skilled in the art that the foregoing and other changes in form and details may be made therein without departing from the spirit and scope of the invention.

What is claimed is:

1. An operator guidance system for use with an input/output terminal in a data entry system comprising:

a media supporting a plurality of images suitable for projection and each of which contains instructional data on the first portion and coded data, in the form of selectively positioned translucent areas, on a second portion of said image and said images being arranged in a predetermined serial order on the said media;

a projection screen positioned in operative registration with one of the images on the media;

projection means positioned in operative registration with the screen for projecting the image supported on the media in registration with the screen onto the screen;

a panel including a plurality of labeled openings in registration with the viewing side of the projection screen receiving the second coded portion of the image, said openings equaling in number the total possible number of translucent areas on the second portion of the images;

light-detecting means under operator control arranged for insertion in one of said openings in said panel;

means for causing relative movement between the said media and the projection means whereby the coded portions of the images are scanned by the inserted light-detecting means;

means responsive to the light-detecting means inserted under operator control in one of the openings in the panel for terminating movement when the light-detecting means detects a translucent area in registration with the detector whereby the instructional data associated therewith is displayed on the screen and the operator may perform functions specified by the displayed instructional data; and means for resuming relative movement between the media and the projection means operable at completion of the instructed functions.

2. An operator guidance system as set forth in claim 1 in which said means for causing relative movement between said media and the projection means include intermittent motive means coupled to the image-supporting media for causing the said media to move intermittently whereby successive serially arranged images are displayed on the said projection screen by the projection means.

3. An operator guidance system as set forth in claim 2 in which:

said means responsive to the light-detecting means includes gate circuit means responsive to the light-detecting means for terminating operation of the means for causing intermittent relative movement between the media and the projection means; and said means for resuming relative movement between the media and the projection means include means under operator control for reactivating the said intermittent motive means.

4. An operator guidance system as set forth in claim 3 in which:

said images are mounted about the periphery of a substantially circular media; and said intermittent motive means is an angular step motor which periodically steps through a predetermined angular rotation and pauses before repeating the cycle.

5. An operator guidance system as set forth in claim 1 in which:

said coded data includes a first and second part, said first part provides an indicia of at least one of several programs which an operator is to execute and is detected by the said operator controlled light-detecting means, and said second part provides an indicia of the total action the operator is to take;

a plurality of fixed light detectors mounted on and in fixed position on said panel for detecting said second part of said coded data for providing an output indicative of the total action required by the operator;

first means under operator control for providing manifestations of operator actions; and second means responsive to the output from said fixed light detectors and said first means for detecting a predetermined relationship therebetween and for conditioning the said means for resuming relative movement between the media and the projecting means.

* * * * *